Figure 1:
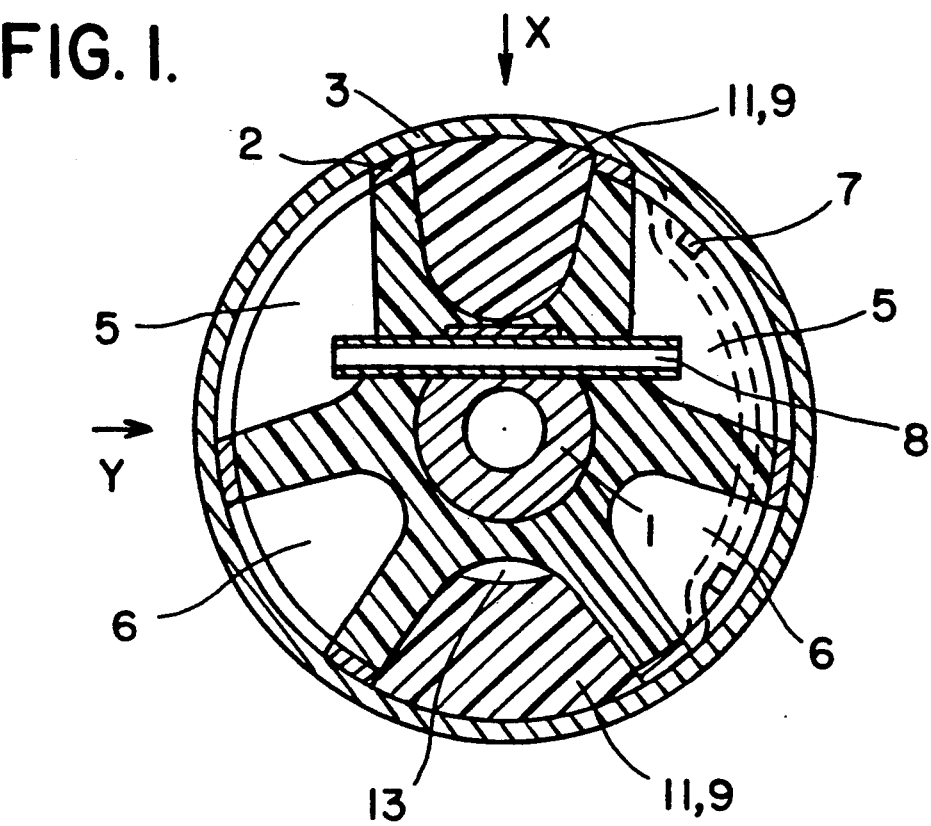

United States Patent [19]

Schwerdt

[11] Patent Number: 5,096,166
[45] Date of Patent: Mar. 17, 1992

[54] ELASTOMERIC SLEEVE SPRING

[75] Inventor: Hans-Werner Schwerdt, Laudenbach, Fed. Rep. of Germany

[73] Assignee: Firma Carl Freudenberg, Weinheim/Bergstr, Fed. Rep. of Germany

[21] Appl. No.: 655,221

[22] Filed: Feb. 12, 1991

Related U.S. Application Data

[63] Continuation of Ser. No. 427,458, Oct. 26, 1989, abandoned.

Foreign Application Priority Data

Nov. 26, 1988 [DE] Fed. Rep. of Germany ....... 3839914

[51] Int. Cl.$^5$ .............................................. F16F 13/00
[52] U.S. Cl. ............................ 267/140.1 C; 267/140.2; 267/140.3; 267/219
[58] Field of Search ............... 267/140.1, 141.2–141.7, 267/140.3, 140.2, 140.4, 153, 152, 219, 121, 220, 292, 279, 281, 35; 180/300, 312, 902; 248/636, 562, 638, 621, 619, 634

[56] References Cited

U.S. PATENT DOCUMENTS

| 3,698,703 | 10/1972 | Hipsher | 267/140.1 |
|---|---|---|---|
| 4,392,640 | 7/1983 | Kakimoto | 267/141.2 |
| 4,667,942 | 5/1987 | Bitschkus et al. | 267/121 X |
| 4,673,314 | 6/1987 | Hara et al. | 267/140.3 X |
| 4,700,934 | 10/1987 | Andrä et al. | 267/141.2 X |
| 4,717,111 | 1/1988 | Saito | 267/140.1 X |
| 4,750,720 | 6/1988 | Wolf et al. | 267/35 X |
| 4,768,760 | 9/1988 | LeFol | 267/140.1 |
| 4,771,990 | 9/1988 | Domer et al. | 267/140.1 |
| 4,848,756 | 7/1989 | Funahashi et al. | 267/293 X |
| 4,895,353 | 1/1990 | Roth et al. | 267/140.1 |
| 4,899,997 | 2/1990 | Thorn | 267/140.1 |
| 4,907,786 | 3/1990 | Okazaki et al. | 267/140.3 X |
| 4,941,649 | 7/1990 | Funahashi et al. | 267/140.1 |

FOREIGN PATENT DOCUMENTS

| 0208652 | 10/1985 | Japan | 267/219 |
|---|---|---|---|
| 0206838 | 9/1986 | Japan | 267/219 |
| 0184249 | 8/1987 | Japan | 248/562 |
| 0149442 | 6/1988 | Japan | 267/140.1 |
| 0003343 | 1/1989 | Japan | 267/140.1 |
| 2192968 | 1/1988 | United Kingdom | 267/140.1 |

Primary Examiner—Douglas C. Butler
Attorney, Agent, or Firm—Felfe & Lynch

[57] ABSTRACT

A hydraulically damping rubber sleeve spring is described the spring body of which contains, in addition to the liquid-filled chambers (5, 6) joined to one another by throttled openings, at least one additional, closed chamber (9) filled with a filling material (10, 11) which is not hydraulically joined to the remaining chambers (5, 6).

2 Claims, 1 Drawing Sheet

ELASTOMERIC SLEEVE SPRING

This application is a continuation of application Ser. No. 427,458, filed Oct. 26, 1989 now abandoned.

The present invention relates to a hydraulically damping elastomeric sleeve spring, for example, a rubber sleeve spring.

Aggregate mountings in vehicles and in the chassis suspension are subject to vertical vibrations as well as vibrations in the longitudinal direction of the vehicle - resulting from driving -; the latter can be caused by acceleration, deceleration and gas change reaction. For reasons of comfort, it is required that the damping elements exhibit a high elasticity. On the other hand, however, the bearing points in the chassis which are exposed to stress by braking forces should exhibit for reasons of driving safety a high rigidity with little spring excursion.

In order to find a solution to this problem rubber sleeve springs have so far been used in practice which exhibit different rigidity and spring excursion in various directions. This has been achieved either by material damping alone or by hydraulic damping alone.

A rubber sleeve spring has been suggested which has additional axial chambers at both sides of the internal part inside the elastomeric body (spring body); the aforesaid axial chambers are open toward at least one of the front channels formed by the elastomeric body and the opposite elastomeric caps (DE-A-36 05 305). Moreover, at least one additional closed chamber which is not connected hydraulically with the rest of the chamber, is filled with a filling material, obviously air. This embodiment is to permit a hydraulic damping, especially in the acoustic frequency range, not only under stress and vibrations in the vertical direction but also in the horizontal direction.

The fact that the acoustic frequency range is to be preferably considered reduces, however, the insulating properties against high frequencies since the hydraulic system significantly increases the usually rather low spring rigidity of the elastomer. Hence, what is required for such a configuration of rubber sleeve springs are high-elasticity elastomers with very low self-damping properties. This does result in a very high damping in a narrow frequency range; but outside this range the damping effect is approximately zero.

To further improve such rubber sleeve springs such that they exhibit in different force introduction directions specifically adjustable, various damping rates, it is necessary to provide a true-to-size and unpredictable modification of the dimensions of the front channels as well as the additional axial chambers.

It is hence an object of the invention to configure a hydraulic elastomeric sleeve spring such that it - in addition to the hydraulic damping which is effective in one specific frequency band - has an additional damping effect which can be freely adjusted with simple constructional measures regarding the direction of the hydraulic damping. It should also be possible to variably adjust the rigidity of the spring in different directions such that there are spring elements which have a high transverse rigidity ratio. A so configured rubber sleeve spring would comply with all requirements of springiness and damping which occur during real driving.

When the closed chambers are filled with polymeric, solid filling material the principle of this method of operation is that the elastic separation wall is subject to bending when force is introduced into the interior tube; the filling material which is present in chambers having no connection, i.e. the ones that are passive, are also subject to deformation. This includes, as in known devices, that the hydraulic liquid is pressed through the channels of the open chambers.

The total damping effect is, hence, composed of the hydraulic channel friction and—in accordance with the invention—the material damping of the filling material in the one or the several closed chambers and it is correspondingly higher than in known hydrosleeves. Even when the friction damping of the hydraulic damping approaches zero, there is still a damping effect created by the material damping. This also applies to any inclined angle of force introduction.

In case of a fluid filling the elasticity of the closed chambers can be altered by making use of the compressibility of the fluid: particularly suitable as a filling is the same hydraulic liquid as used in the open chambers or a gas, preferably air. What basically applies is that fluid fillings lead to a low rigidity in the closed chambers and, hence, to low damping.

In any case it is possible, and this is a particular advantage of the invention to dispose the closed chamber or chambers as desired either in direction of force introduction transversely or at an angle thereto and, hence, provide direction with a preferred damping effect. The description of the figures explain these variations in further detail hereinafter.

The solid filling substances for the chambers consist of polymeric elastomeric materials, the damping properties of which are different from the ones of the spring body. Moreover, a combination is achieved which includes a combination of the damping properties of a gaseous fluid and the ones of elastomeric filling material; the elastomeric filling material fills out the closed chambers or chambers only partially; advantageously, the remaining volume is air. The free space present therein between filling material and spring body, damped by an air volume, causes a moving of the phases of the vibrations and a reduction of the dynamic rigidity; hence, the closed chamber has reducing properties. The frequency range which can be reduced thereby most efficiently can easily be determined by pre-tests. The damping properties of the rubber sleeve spring in accordance with the invention can be anisotropically adjusted by providing one of the closed chambers with an elastomeric filling and the other one with a fluid filling. The result is an asymmetric deformation of the spring bodies when the closed chambers are not disposed in direction of force introduction.

In accordance with the invention, a hydraulically damping elastomeric sleeve spring comprises an internal pipe and an external pipe spaced apart thereto. The spring includes a spring body made of an elastomeric material which is disposed in an interspace between both pipes and adhesively connected with both pipes. The sleeve spring also includes at least two liquid-filled, open chambers distributed over the circumference of the spring body and separated by a separating wall and joined by throttle openings. The sleeve spring also includes at least one further closed chamber filled with a filling material in the spring body and which is not hydraulically connected to the two open chambers. The filling material of the one chamber is of a solid, polymeric material which has a resilient rigidity and damping properties distinct from the material of the spring body. The filling material fills out the chamber completely except for a remaining volume which is filled with air and which is a pressure compensating chamber facing the internal pipe.

For a better understanding of the invention, together with other and further objects thereof, reference is made to the following description, taken in connection with the accompanying drawings, and its scope will be pointed out in the appended claims.

Figure 2:
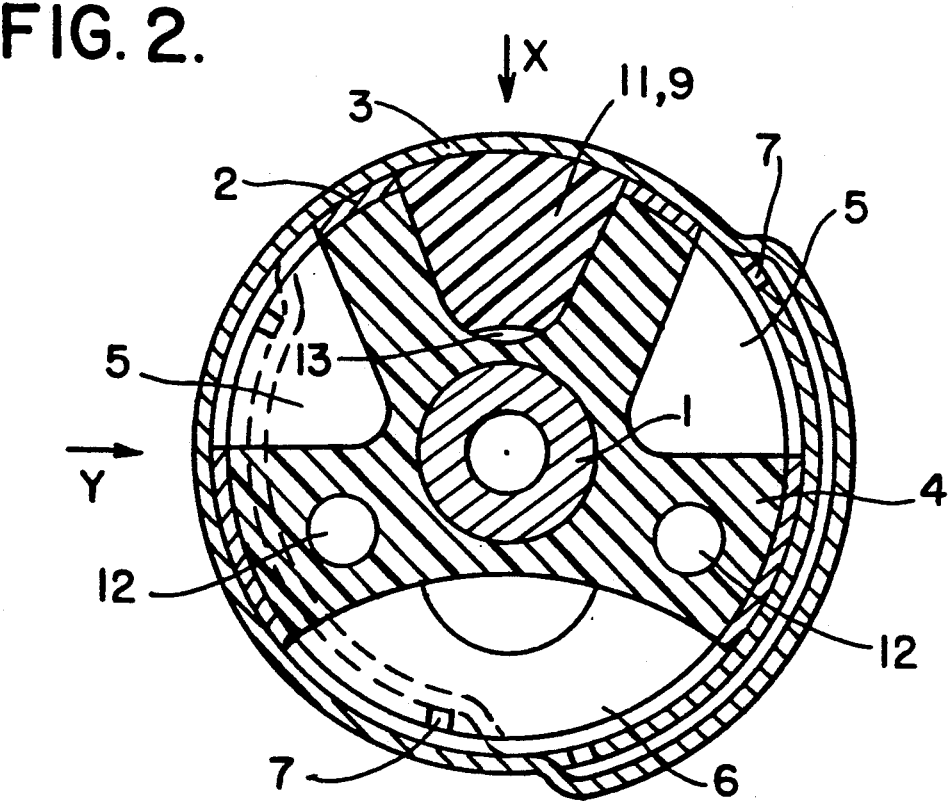

Referring now to the drawings:

FIGS. 1 and 2 are lateral sectional views of elastomeric sleeve springs in accordance with the invention.

The closed chambers are disposed in direction of force introduction (FIGS. 1 and 2), in a position symmetric or asymmetric to each other, respectively.

The rubber sleeve spring as illustrated in FIGS. 1 and 2 includes, respectively, an internal pipe 1, an external pipe 2, a closing sleeve 3 and an internal spring body 4.

The open chambers 5, 6 which are filled with hydraulic fluid are joined via throttled openings 7, 8. In accordance with the invention the spring body 4 includes closed chambers 9 without connecting channel; the aforesaid chambers are at least partially filled with fluid or with filling material 11.

FIG. 1 shows a configuration wherein a damping is effective in X-direction as well as in Y-direction; this damping is cumulatively composed of the hydraulic channel friction and the material damping of the filling materials 11.

By selecting a soft, damping elastomer as a bottom filling material 11 which is formed such that it encloses an air-containing pressure compensation chamber 13, the spring rigidity in contact direction X can be kept low whereas in a counter direction it is significantly higher by using a harder filling material 11 (on top in the drawing).

FIG. 2 shows a rubber sleeve spring which is provided with three hydraulically active chambers 5, 6. The closed chamber 9 is only partially filled by an elastomeric body 11. The remaining volume is filled with air and serves as a pressure compensation chamber 13: In case there is static preload in direction X this pressure compensating chamber 13 expands thus generating a subatmospheric pressure. The separating walls between the hydraulic chambers 5, 6 are here provided with axial boreholes 12.

A vibration from direction X is damped twice by dynamic channel friction. The static spring rigidity of the spring body is low in direction of force introduction, in the counter direction, however, it is high due to the elastomeric filling 11 which acts as a stopper. The characteristic spring curve is strongly progressive.

Altogether, this design exhibits a particularly low dynamic and static spring rigidity in the X-direction. According to FIG. 2 the latter is further reduced in that axial boreholes 12 in the separating walls are provided between the hydraulically joined chambers 5, 6.

A rubber sleeve spring in the configuration of FIG. 2 can be used as an engine mounting which hydraulically damps contact forces and transverse vibrations and which, in addition, eliminates transverse vibrations in direction Y by means of material damping. The diminishing spring motion of the engine in direction ($-X$) is damped and progressively limited.

While there have been described what are at present considered to be the preferred embodiments of this invention, it will be obvious to those skilled in the art that various changes and modifications ma be made therein without departing from the invention, and it is, therefore, aimed to cover all such changes and modifications as fall within the true spirit and scope of the invention.

What is claimed is:

1. Hydraulically damping elastomeric sleeve spring comprising:
    a single internal pipe;
    an external pipe spaced apart thereto;
    a spring body made of an elastomeric material which is disposed in an interspace between both said pipes and adhesively connected with both said pipes;
    at least two liquid-filled, open chambers distributed over the circumference of said body and separated by a separating wall and joined by throttle openings;
    at least one further closed chamber substantially filled with a filling material in the spring body and which is hydraulically isolated from said at least two open chambers;
    said filling material of said at least one further closed chamber being of a solid, polymeric material which has a resilient rigidity and damping properties distinct from the material of the spring body, said spring body and said filling material providing different damping properties for the spring in two different radial directions;
    said filling material and a remaining volume filling out said at least one further closed chamber completely, said remaining volume being filled with air and being a pressure compensating chamber facing said internal pipe.

2. Hydraulically damping elastomeric sleeve spring according to claim 1 which includes two closed chambers, one of which is filled with an elastomeric filling material and the other one with a fluid filling material.

* * * * *